United States Patent [19]

Sullivan

[11] 4,438,583
[45] Mar. 27, 1984

[54] FISHING LURE

[76] Inventor: Raymond B. Sullivan, 443 Kendry, Bloomfield Hills, Mich. 48013

[21] Appl. No.: 392,925

[22] Filed: Jun. 28, 1982

[51] Int. Cl.³ .............................................. A01K 85/00
[52] U.S. Cl. .................................... 43/42.06; 43/42.31
[58] Field of Search .................. 43/42.06, 42.31, 42.48

[56] References Cited

U.S. PATENT DOCUMENTS

| 1,609,855 | 12/1926 | Bayer | 43/42.48 |
| 2,538,459 | 1/1951 | Kasmeyer | 43/42.06 |
| 2,731,755 | 1/1956 | Ward et al. | 43/42.06 |
| 2,846,805 | 8/1958 | Waitzman | 43/42.06 |
| 3,178,848 | 4/1965 | Lane | 43/42.06 |
| 3,269,050 | 8/1966 | Garwood | 43/42.33 |
| 4,069,609 | 1/1978 | Demy | 43/42.06 |
| 4,098,017 | 7/1978 | Hall | 43/42.06 |
| 4,102,075 | 7/1978 | Wagner | 43/42.06 |

Primary Examiner—Gene P. Crosby
Attorney, Agent, or Firm—Alex Rhodes

[57] ABSTRACT

The elongated ovoid body of the lure has the appearance of a small baitfish. Within the body is a longitudinal flow passage with a diverging nozzle at the egress portion thereof which produces effects on the body, similar to the actions of the caudal fins of the baitfish. The ingress portion of the passage gently converges to a cylindrical throat portion which terminates a a concave shaped baffle. The baffle directs the flow of water in the passage into the entrance portion of the nozzle through which the water is discharged from the body. The nozzle, which is oblique to the axis of the body, is of the form of diverging triangular discharge nozzle. The anterior portion of the body, shaped in the form of a leading scoop, causes the lure to dive when towed through the water. When being towed through the water, the lure swims with excitable side to side darting movements, thereby resembling an injured or otherwise excited fish. The depth and speed of the side to side darting movements of the lure are responsive to the speed at which the lure is towed through the water.

9 Claims, 8 Drawing Figures

FISHING LURE

BACKGROUND OF THE INVENTION

Plug type lures for casting and trolling, resembling small baitfish, are commong in the prior art. Numerous theories have been developed to explain why some lures attract and trigger the striking instinct of a gamefish. Among these theories, varying emphasis has been placed on the role of the shape, color, sound and motion of a successful lure.

One recent theory holds that gamefish are strongly attracted to weak, injured fish which move in erratic injured actions. It is claimed in this instance that the movements and sounds of the bait draw strike after strike until a predator gamefish hooks itself.

The effectiveness and movements of a lure are dependent upon features which are specific to the construction of the lure. These features have ranged from internal baffles to gas discharge means in the prior art.

With the foregoing in mind, a lure which better stimulates the excitable, side to side, darting behavior and sounds of an injured baitfish would enhance the sport of fishing and contribute to the art.

PRIOR ART

Kasmeyer U.S. Pat. No. 2,538,459 discloses a lure with an internal zigzag tube for producing a particular motion of a swimming fish.

Ward U.S. Pat. No. 2,731,755 discloses a tubular body lure with opposing V-notches in the wall of the tubular body which produce an upward force.

Waitzman U.S. Pat. No. 2,846,805 discloses a tubular body lure with internal baffles which produce darting motions when a variable pull is exerted on the lure.

Lane U.S. Pat. No. 3,178,848 discloses a tubular body lure with a diverging conical baffle through which calcium carbide gas is discharged to lift the rear portion of the lure.

Garwood U.S. Pat. No. 3,269,050 discloses a lure with a small internal passageway wherein a fishing line is routed.

Demy U.S. Pat. No. 4,069,609 discloses a lure having a cone shaped tubular body through which water flows.

BRIEF DESCRIPTION OF THE INVENTION

The present invention is related to fishing lures and more particularly to plug type casting and trolling lures which are towed or retrieved in the water.

The elongated ovoid body of the lure with its scarfed anterior and truncated posterior end portions resembles a small baitfish. To further enhance this appearance, a pair of eyes are provided on opposing lateral surfaces of the anterior portion of the body.

Extending through the body, from the scarfed anterior to the truncated posterior end portions, is a longitudinal flow passage. The passage includes a funnel shaped ingress portion, an adjacent cylindrical center portion which communicates with the ingress portion, a diverging egress portion which communicates with the center portion and a spherical baffle at the junction of the center and egress portions. The ingress and center portions of the body are aligned with the longitudinal axis of the body while the egress portion is in an oblique orientation to the body.

When the lure is towed or retrieved in the water the lure dives below the surface and swims with a side to side darting motion, resembling the actions of an injured or otherwise excited baitfish. The depth and intensity of movements of the lure are responsive to the speed of towing or retrieval in the water. The effectiveness of the lure is further improved by sonic waves which eminate from the flow passage and body of the lure.

It is a primary object of the present invention to provide a lure for casting and trolling which moves with excitable, side to side darting movements, sending out sonic waves when towed or retrieved in the water.

It is another objective to provide a lure whose depth and actions are responsive to the speed at which the lure is towed through the water.

It is another object to provide an effector in a lure which simulates the action of the caudal fins of an excited or injured fish.

It is another object to provide a lure which is low in cost and highly effective in attracting and triggering the striking instinct of a gamefish.

The foregoing objects, along with additional objects, features, advantages and benefits of the invention become more apparent in the ensuing description and accompanying drawings which disclose the invention in detail. A preferred embodiment is disclosed in accordance with the best mode contemplated in carrying out the invention. The subject matter in which an exclusive property right is claimed is set forth in each of the numbered claims at the conclusion of the description.

DESCRIPTION OF THE PREFERRED EMBODIMENT

Figure 1:
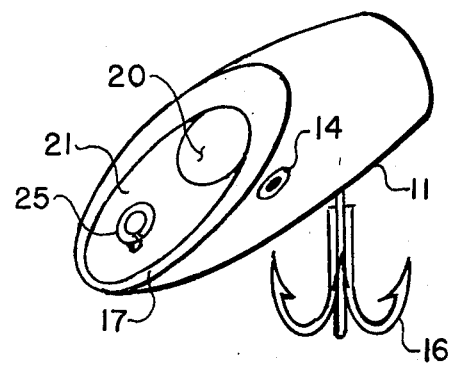
FIG. 1 is a perspective view showing the external appearance of the invention when viewed from the front.
Figure 2:
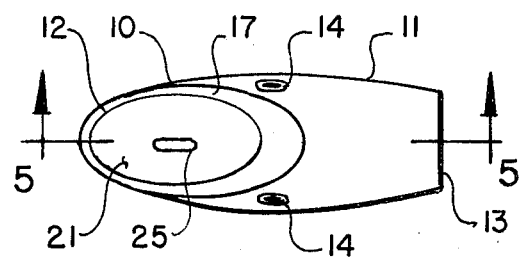
FIG. 2 is a plan view of the invention.

Referring now to the drawings wherein like numerals designate like and corresponding parts throughout the several views, the present invention of a fishing lure 10 is shown as resembling in appearance a small baitfish having an elongated body 11 with scarfed anterior 12 and truncated posterior 13 end portions. A pair of eyes 14 are attached or painted onto opposing lateral surfaces of the anterior portion of the body 11. On the ventral portion 19 of the body 11, an eyelet 15 is suitably attached which receives and retains a fishing hook 16. Optionally, a second hook, not shown, may be suitably attached to the forward portion of the body 11.

The streamlined body 11 is preferably made from a rigid solid or cellular plastic material. Typical weights for the body 11 with these materials are 8 grams for solid plastic and 5½ grams for cellular plastic. As will be observed from the drawings, one benefit of the invention is that the body 11 can be cast in a single piece with the low cost process of injection molding.

The scarfed portion 12 at the anterior end of the body forms a leading scoop 17 which extends angularly downward from the mid portion of the dorsal surface 18 of the body 11 to the foremost point of the ventral surface 19 of the body 11. The surface of the scoop 17 is slightly concave across the anterior end of the body 11. The side view angle of the scoop 17 is typically about twenty-five degrees.

Figure 3:
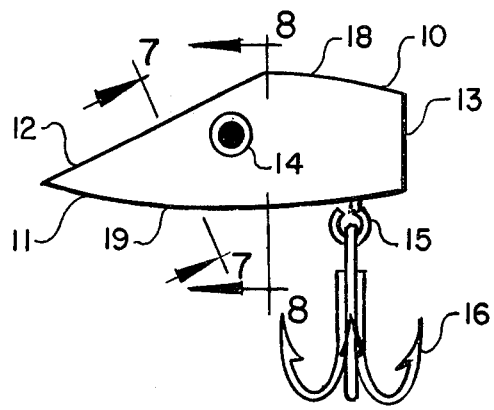
FIG. 3 is a side elevational view of the invention.

With reference to FIG. 3, within the interior of the body 11 is a longitudinal flow passage 20 having adjoining funnel shaped ingress 21, cylindrical shaped center 22 and diverging egress 24 portions. The axes of the ingress 21 and center 22 portions are aligned with the longitudinal axis of the body and are offset from and at an angular orientation to the axis of the egress portion 24 of the passage 20. At the junction of the ingress 21 and center 22 portions is a spherical baffle 23 which directs the flow of water in the passage 20 into the diverging egress portion 24.

The funnel shaped ingress portion 21 which extends from the leading scoop 17 to the center portion 22 reduces the turbulence of water entering the passage 20. Suitably attached to the lower portion of the ingress portion 21 is an eyelet 25 for receiving and attaching a fishing line 26.

Figure 4:
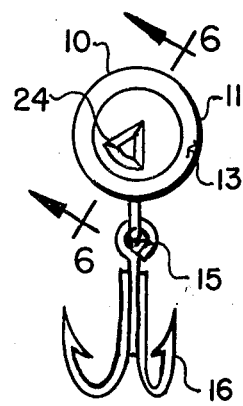
FIG. 4 is a rear elevational view.
Figure 5:
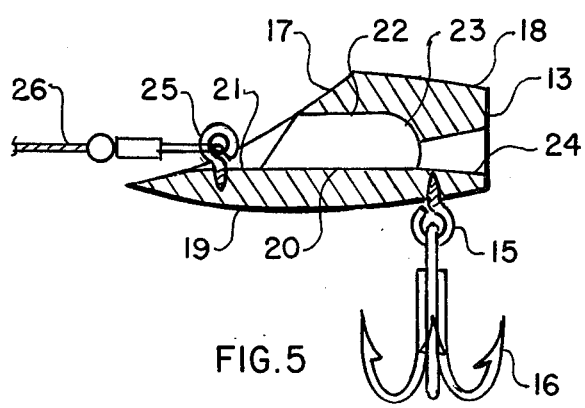
FIG. 5 is a cross sectional view taken in the direction of arrows 5—5 in FIG. 1.
Figure 6:
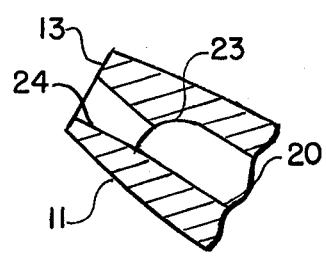
FIG. 6 is a cross sectional view taken in the direction of arrows 6—6 in FIG. 4.
Figure 7:
FIG. 7 is a cross sectional view taken in the direction of arrows 7—7 in FIG. 3.
Figure 8:
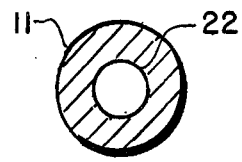
FIG. 8 is a cross sectional view taken in the direction of arrows 8—8 in FIG. 3.

The diverging egress portion 24 of the passage 20 is preferably triangular in cross-section. When viewed in FIG. 4, the rear elevational view, the axis of the egress portion 24 is at about a 7 o'clock position. As will be noted, when water flows through the passage 20 excitable side to side movements of the body 11 occur which resemble the movements produced by the caudal fins of an injured or otherwise excited baitfish.

The manner of using my invention is as follows. As the lure 10 is pulled through the water, by trolling or retrieved after casting, a downward force exerted by the water on the leading scoop 17 causes the lure 10 to dive to a depth which is dependent on the speed of movement of the lure 10. After equilibrium is achieved for the vertical forces acting on the lure 10, the lure 10 continues with a swimming motion at a constant depth as it is moved through the water. The forward motion of the lure 10 forces water into ingress portion 21 of the flow passage 20 and through the center portion 22 wherein the water is accelerated as it moves through the reduced cross section of the center portion 22. The water is then directed by the baffle 23 into the egress portion 24 and discharged from the body 11.

The diverging egress portion 24 produces an unbalanced pressure gradient across the posterior portion of body 11. As a result of the pressure gradient, the lure 10 is urged to dart to the side with a slight rotation about the longitudinal axis of the body 11. This causes unbalanced lateral forces acting on the body and a reversal in the direction of the darting motion. The side to side darting motion is self sustaining as the lure is pulled through the water and the intensity of the darting motion increases with increases of the forward motion of the lure.

The discharge of water from the passage 20 and the side to side motions of the body 11 produce sonic waves which increase the effectiveness of the invention.

Although a preferred embodiment of the present invention has been described herein, it is obvious that many changes can be made in the size, shape, arrangement and details of the various elements without departing from the spirit of the invention.

I claim:
1. A fishing lure for casting and trolling comprising:
 (a) a body with longitudinal flow passage within the interior of the body, said flow passage having adjoining ingress and center portions, the axes of said portions aligned with the longitudinal axis of the body, and an egress portion adjoining the center portion, the axis of the egress portion offset from and oblique to the axis of the center portion, and a baffle at the junction of the center and egress portions;
 (b) a means for attaching a fishing line to the body;
 (c) at least one hook attached to the body; and
 (d) a means for attaching the hook to the body.
2. The fishing lure as recited in claim 1 wherein the shape of the body is an elongated ovoid.
3. A fishing lure for casting and trolling comprising:
 (a) an elongated ovoid body with a longitudinal flow passage within the interior of the body, said flow passage having adjoining funnel ingress and cylindrical center portions, the axes of said portions aligned with the longitudinal axis of the body, a diverging egress portion adjoining the center portion, the axis of the egress portion offset from and oblique to the axis of the axis of the center portion, and a spherical baffle at the junction of the center and egress portion;
 (b) a means for attaching a fishing line to the body;
 (c) at least one hook attached to the ventral portion of the body; and
 (d) a means for attaching the hook to the body.
4. The fishing lure as recited in claim 3 wherein the diverging egress portion has a triangular cross-section.
5. The fishing lure as recited in claim 3 wherein the anterior portion of the body is scarfed and the posterior portion of the body is truncated.
6. The fishing lure as recited in claim 3 wherein the body has a pair of eyes on opposing lateral surfaces at the anterior portion of the body.
7. A fishing lure for casting and trolling comprising:
 (a) an elongated ovoid body, said body having a scarfed anterior end portion extending angularly downward from the mid portion of a dorsal surface of the body to the foremost point of a ventral surface of the body, a truncated posterior end portion, a pair of eyes on opposing lateral surfaces at the anterior portion of the body, and a longitudinal flow passage within the interior of the body, said flow passage having adjoining funnel ingress and cylindrical center portions, the axes of said portions aligned with the longitudinal axis of the body, a diverging triangular egress portion adjoining the center portion, the axis of the egress portion offset from and oblique to the axis of the center portion, and a sperical baffle at the junction of the center and egress portions;
 (b) a means for attaching a fishing line to the body;
 (c) at least one hook attached to the ventral portion of the body; and
 (d) a means for attaching the hook to the ventral portion of the body.
8. The fishing lure as recited in claim 7 wherein the means for attaching a fishing line to the body is an eyelet attached to the lower portion of the ingress portion of the flow passage.
9. The fishing lure as recited in claim 7 wherein the means for attaching the fishing hook to the ventral portion of the body is an eyelet attached to the ventral portion of the body.

* * * * *